United States Patent
Boszormenyi et al.

(10) Patent No.: US 6,394,105 B1
(45) Date of Patent: May 28, 2002

(54) INTEGRATED LASER CLEANING AND INSPECTION SYSTEM FOR RIGID THIN FILM MEDIA FOR MAGNETIC RECORDING APPLICATION

(75) Inventors: Istvan McClain Boszormenyi, Hayward; Amber Sharma, Freemont; Rajiv Y. Ranjan, San Jose, all of CA (US)

(73) Assignee: Seagate Technology, Inc., Scotts Valley, CA (US)

( * ) Notice: Subject to any disclaimer, the term of this patent is extended or adjusted under 35 U.S.C. 154(b) by 0 days.

(21) Appl. No.: 09/272,184

(22) Filed: Mar. 18, 1999

Related U.S. Application Data

(60) Provisional application No. 60/078,625, filed on Mar. 19, 1998.

(51) Int. Cl.$^7$ .............................. B08B 7/04; B23K 26/04
(52) U.S. Cl. ............................. 134/1.3; 134/1; 134/18; 134/902; 219/121.62; 219/121.85; 356/369
(58) Field of Search ............................... 134/1, 1.3, 18, 134/202; 356/369; 219/121.6, 121.61, 121.62, 121.85, 121.83

(56) References Cited

U.S. PATENT DOCUMENTS

| | | | |
|---|---|---|---|
| 4,668,860 A | * | 5/1987 | Anthon ...................... 250/225 |
| 5,024,968 A | * | 6/1991 | Engelsberg ................. 437/173 |
| 5,196,906 A | * | 3/1993 | Stover et al. ............... 356/446 |
| 5,313,542 A | * | 5/1994 | Castonguay ................ 385/115 |
| 5,406,882 A | * | 4/1995 | Pearson et al. ......... 250/339.01 |
| 5,523,543 A | * | 6/1996 | Hunter, Jr. et al. ..... 219/121.62 |
| 5,608,527 A | * | 3/1997 | Valliant et al. ............. 356/371 |
| 5,818,592 A | * | 10/1998 | Womack et al. ............ 356/357 |
| 6,031,615 A | * | 2/2000 | Meeks et al. ................ 356/381 |

FOREIGN PATENT DOCUMENTS

| | | | |
|---|---|---|---|
| JP | 60-219637 | * | 11/1985 |
| JP | 1-107318 | * | 4/1989 |

* cited by examiner

*Primary Examiner*—Alexander Markoff
(74) *Attorney, Agent, or Firm*—Merchant & Gould

(57) ABSTRACT

Cleaning and inspecting a surface of the substrate comprises subjecting the surface to the output of a laser source for applying a cleaning energy to the surface and thereby remove contaminants on the surface. The laser source is used for inspecting the surface being cleaned and to measure the effect of the cleaning.

18 Claims, 2 Drawing Sheets

INTEGRATED LASER CLEANING AND INSPECTION SYSTEM FOR RIGID THIN FILM MEDIA FOR MAGNETIC RECORDING APPLICATION

CROSS-REFERENCE TO RELATED APPLICATIONS

The present invention relates to Provisional Application Serial No. 60/078,625, filed Mar. 19, 1998, by Istvan M Boszormenyi, and entitled "INTEGRATED LASER CLEANING AND INSPECTION SYSTEM". The contents of this application is incorporated by reference herein.

BACKGROUND OF THE INVENTION

This invention relates to laser cleaning and inspecting of surfaces. In particular the system is for use on disc surfaces which are used for recording data.

In most high technology industries, for instance, semiconductor device, hard disc or flat panel display manufacturing, improved performance is linked to the ability to reduced the feature size. Thus there is the narrower line width, smaller bit cell or pixel size. As a consequence, the size of detrimental contamination, for example, particles, steadily decreases. Hence, there is an increased demand for effective cleaning technologies, tools and processes. To reduce cost these cleaning processes need to be monitored closely.

Laser cleaning has emerged as a potential new dry cleaning technology to remove particles and other contaminants from surfaces. For example the Radiance (U.S. Pat. No. 5,024,968) process utilizes a pulsed intense light source (such as an excimer laser) in the presence of an inert gas flow over the surface to remove contamination.

With the reducing feature size the time to necessary to inspect a surface for cleanliness increases and it becomes impractical to inspect every surface or even the entire surface going through a cleaning process. Usually, samples are taken and a significant portion of these surfaces are analyzed for cleanliness.

Most commonly these inspection tools are based on light scattering. A small beam of light is directed at the surface and photomultiplier tubes detect the scattered light. The smaller the wavelength the smaller particles can be detected.

There is need top provide for an enhanced technique, system and apparatus for cleaning and inspecting surfaces

SUMMARY OF THE INVENTION

According to the invention cleaning and inspecting a surface of the substrate comprises subjecting the surface to the output of a laser source for applying a cleaning energy to the surface and thereby remove contaminants on the surface. The laser source is used for inspecting the surface being cleaned and to measure the effect of the cleaning.

The integrated laser cleaning and inspection system uses the light from laser cleaning light source as the inspection light source. The system allows:

a) in situ 100% surface inspection of every workpiece during laser cleaning b) controlling the laser cleaning process c) sorting the substrates based on cleanliness and damage.

DETAILED DESCRIPTION OF THE PREFERRED EMBODIMENT

In the following description, reference is made to the accompanying drawings which form a part hereof, and which show, by way of illustration, several embodiments of the present invention. It is understood that other embodiments may be utilized and structural changes may be made without departing from the scope of the present invention.

The invention combines laser cleaning and inspection in one tool. The laser beam used for cleaning is also used as the light source for the inspection. As the surface is being cleaned the level of cleanliness can be monitored at the same time. Since the entire surface of every workpiece needs to be cleaned and not just samples the tool allows 100% inspection which would be cost prohibitive if the inspection was to be carried out off-line.

Figure 1:
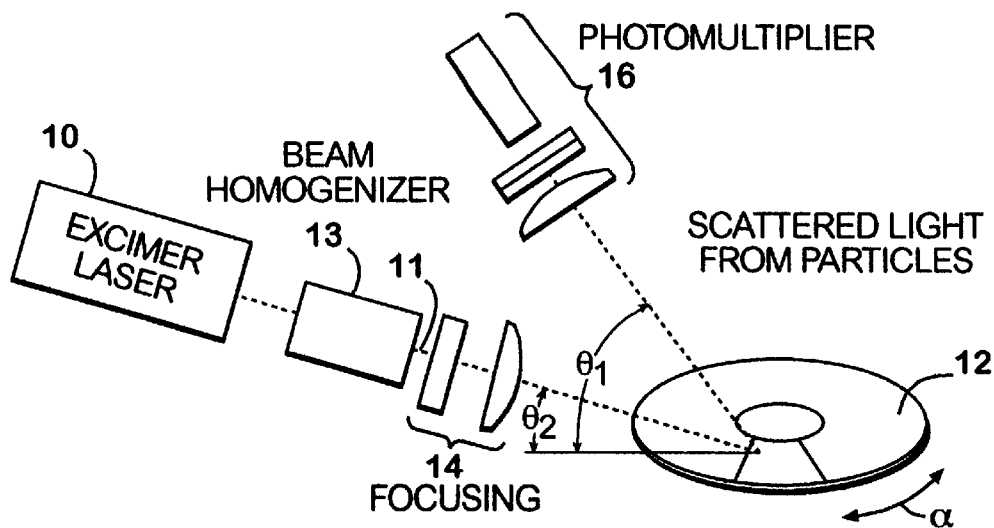
FIG. 1 is a representation of an integrated laser cleaning and inspection tool.

A drawing of such an integrated system for cleaning and monitoring cleanliness for discs is shown in FIG. 1 with excimer laser 10 as a source for a beam 11 and a hard disc 12 as a substrate for cleaning. An ultraviolet (UV) laser beam 11 is favored in both cleaning and detection processes because it allows the removal and detection of smaller particles. The beam from the source 10 is directed through a beam homogenizer 13 and focusing lenses 14 to the disc 12.

Figure 2:
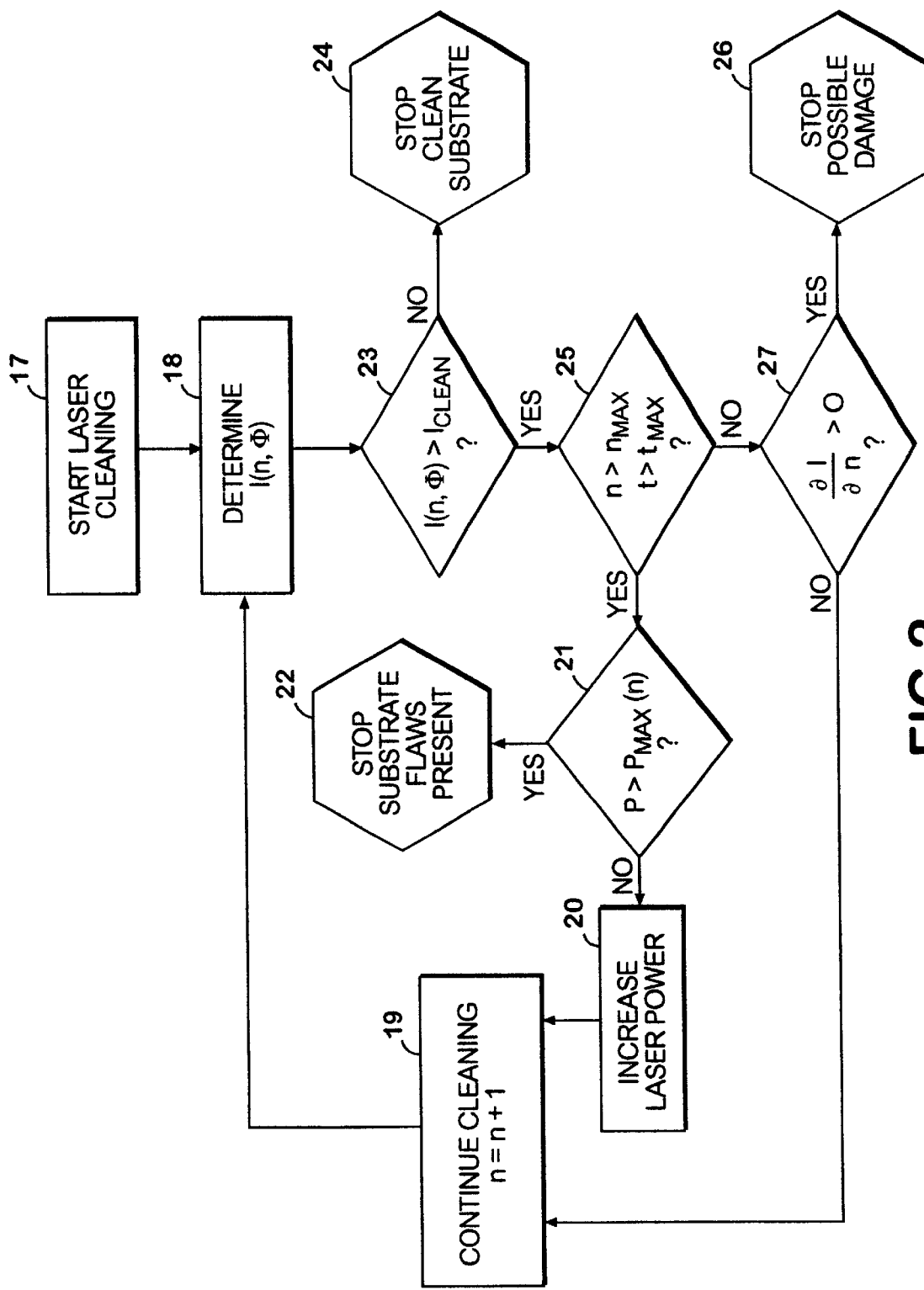
FIG. 2 is a flow diagram illustrating the laser cleaning process.

The intensity of the scattered light from contaminants on the substrate 12 is directed to focusing lenses 15 and collected with one or more photomultiplier tubes (PMT) 16. The signal from the PMT 16 is used to control the cleaning process and to make decision on the quality of the substrate. A process control protocol is outlined in the flow diagram of FIG. 2. In this diagram,

| | |
|---|---|
| I | intensity of scattered light from PMT |
| n | number of laser pulses |
| φ | angle |
| $I_{clean}$ | background intensity, scattering from a clean surface |
| $n_{max}$ | maximum n allowed (e.g., $n_{ave} + 2\sigma$) |
| P | laser power |
| $P_{max}$ | maximum safe laser power. |

At the start of the process the excimer laser 10 is activated to start cleaning as indicated by box 17. The intensity of the scattered light and the angle of the scattered light is determined by the photomultiplier 16 as indicated in box 18. Depending upon that determination, the cleaning continues as indicated in 19. In this situation there are further pulses of light which are applied by the excimer laser 10. The excimer laser 10 can increase in power, as indicated by 20, if necessary. Where that power is increased greater than the maximum safe laser power as indicated in 21, the process is stopped as indicated in 22, since the substrate 12 would have flaws. The increase in power can be caused by either the number of laser pulses exceeding the maximum amount or the time of the pulses being applied increases beyond a maximum amount as indicated in 25. As indicated in 23, when the intensity of the scattered light as measured by the photomultiplier 16 increases in a number of pulses and angle beyond the amount necessary, then a substrate cleaning process is stopped as indicated in 24. In the situation where the intensity of the scattered light relative to the number of laser pulses is greater than a predetermined number as indicated in 27, then the process stops because of possible damage to the substrate as indicated in 26.

The location of the laser spot on the disc surface is identified by the radial (r) and angular (α) position on the disc surface. The area to be scanned on the disc surface can be selected by choosing the appropriate radial and angular position limits. Angle $\theta_1$ is the angle at which the detector(s) are placed to collect the scattered light from the disc surface. A number of detectors will be placed at different angles (0–90°) around the disc to ascertain the size of the particle. Angle $\theta_2$ is the angle of incidence of the laser beam on the disc surface. This angle will be chosen, between 0–45°, to obtain maximum cleaning and minimum damage to the substrate. The maximum number of pulse $n_{max}$ will vary from 30–200 Hz for different substrates. This quantity is used to control the amount of laser energy incident on the substrate.

Figure 3:
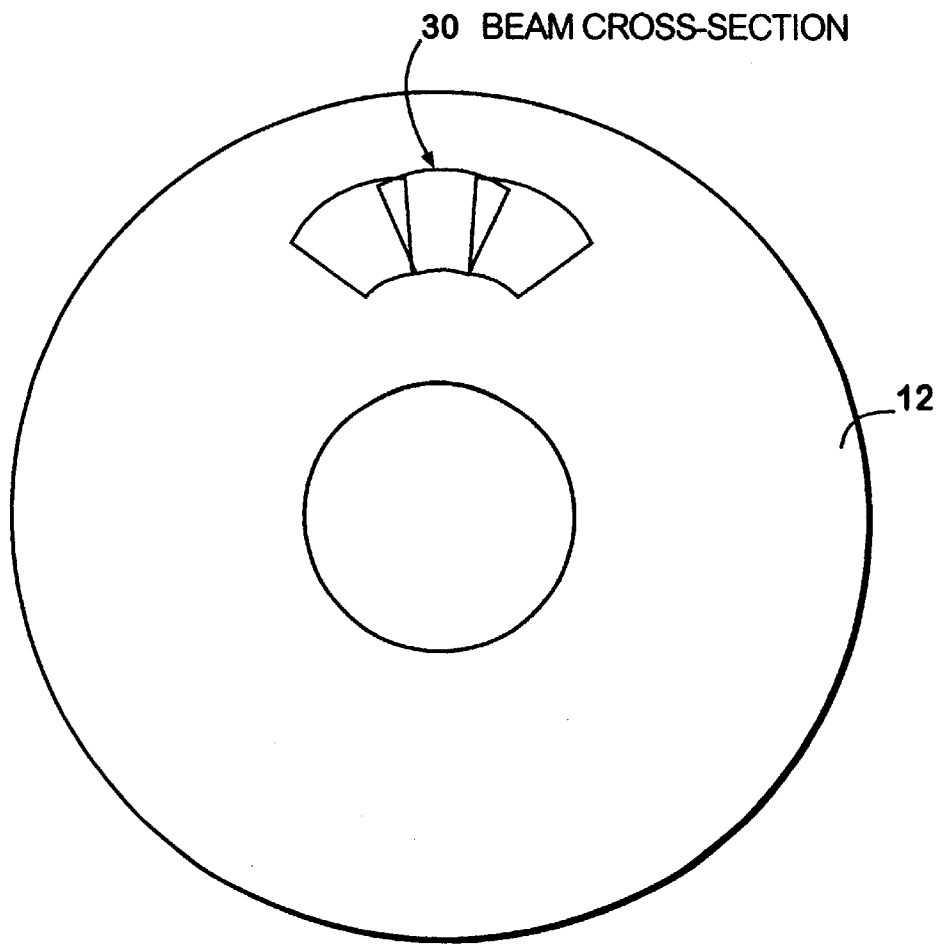
FIG. 3 is an example of modifying the laser beam cross-section to achieve uniform energy distribution.

For efficient cleaning of the discs the laser beam shape incident on the disc surface is modified with properly designed shutters and optics. This is done so that uniform energy is made incident throughout the disc surface. FIG. 3 shows a scheme of designing the beam cross-section 30 such that the desired overlap over two subsequent measurements can be obtained.

In this scheme for disc cleaning the scattered light intensity is measured as a function of number of laser pulses used and angular location on the disc. If the intensity reduces to a level characteristic of a clean surface there is no need for further exposure and the cleaning process is aborted.

There may be a need for a minimum exposure, however, to assure uniform surface properties on the post clean substrate. If the intensity is higher even after a $n_{max}$ number of pulses applied, the laser power can be increased up to a the maximum safe laser power ($P_{max}$). If the scatter intensity increases with the number of pulses, surface roughening or other damage to the surface is likely. The discs are taken out of the process flow if there is indication of surface damage, or the maximum safe laser power is reached without reduction of the scatter intensity. The values of $I_{clean}$, $n_{max}$, and $P_{max}$ are determined experimentally with calibration discs.

The geometry of the source 10 and detection PMT(s) 16 are optimized to allow discrimination of particles and other non-removable surface features such as pits, bumps and micro scratches.

In one preferred embodiment, laser cleaning and inspection procedures are carried out, for example, on a surface of a recording medium or disc substrate, prior to applying a thin layer of film of magnetic material to the surface. In further embodiments, such laser and inspection procedures may also, or alternatively, be carried out on the layer or film of magnetic material, after the material has been applied (such as sputtered on) to the substrate surface.

Combining laser cleaning with inspection results in savings in tool cost. The yield of downstream processes will increase because discs that cannot be cleaned are not be processed any further.

CONCLUSION

This concludes the description of the preferred embodiment of the invention. The following describes some alternative embodiments for accomplishing the present invention.

For example, any number of different types of surfaces could be used with the present invention. Those skilled in the art will recognize that the present invention could be applied to both magnetic and optical disk drives.

In another example, surfaces having different structures and components from those described herein could benefit from the present invention. Those skilled in the art will recognize that the system, method and apparatus could have a different steps and structures from that disclosed herein without departing from the scope of the present invention. Those skilled in the art will recognize that the present invention could be used with heads that only read, but do not record. Those skilled in the art will also recognize that the present invention could be used to position optical heads rather than magnetic heads.

The foregoing description of the preferred embodiment of the invention has been presented for the purposes of illustration and description. It is not intended to be exhaustive or to limit the invention to the precise form disclosed. Many modifications and variations are possible in light of the above teaching. 'It is intended that the scope of the invention be limited not by this detailed description, but rather by the claims appended hereto.

What is claimed is:

1. Apparatus for cleaning and inspecting a surface of a substrate comprising:

a laser source for subjecting the surface to an output of the laser source to thereby apply a cleaning energy to the surface and remove contaminants on the surface; and means for inspecting with the output of the laser source the surface being cleaned, for measuring with the output of the laser source the effect of cleaning, and for controlling the laser source output in response to the measured effect of cleaning.

2. Apparatus as claimed in claim 1 including means for terminating the cleaning when at least one of the following conditions exist as determined by the inspection measurement:

a) the surface is determined to be effectively cleaned within a predetermined parameter;

b) the surface is damaged; or c) the surface is flawed.

3. Apparatus as claimed in claim 1 wherein the means for inspecting the surface is for inspecting a surface of cleaned work pieces prior to further processing of the surface.

4. Apparatus as claimed in claim 1 including means for distinguishing substrates with a clean surface or substrates which are either flawed or damaged.

5. Apparatus as claimed in claim 1 including means for controlling the output of the laser source in at least one of the following respects: laser power, number of laser pulses, or angle between the surface and the direction of the laser source output directed to the surface.

6. An apparatus as claimed in claim 1 including means for measuring the output of the laser source in at least the respects of the intensity of scattered light from the substrate or the angle of the scattered light from the substrate.

7. An apparatus as claimed in claim 1 including means of modifying the laser source output cross-section incident on the surface.

8. An apparatus as claimed in claim 5 including means for measuring the output of the laser source in at least the respects of the intensity of scattered light from the substrate or the angle of the scattered light from the substrate.

9. A method for cleaning and inspecting a surface of a substrate, comprising:

subjecting the surface to an output of a laser source for applying a cleaning energy to the surface and thereby removing contaminants;

analyzing the laser source output to inspect the surface being cleaned and to measure the effect of the cleaning; and controlling the laser source output in response to the measured effect of cleaning.

10. A method as claimed in claim 9 including terminating the cleaning when at least one of the following conditions exist as determined by the analyzing to inspect and to measure:

a) the surface is determined to be effectively cleaned within a predetermined parameter;

b) the surface is damaged; or c) the surface is flawed.

11. A method as claimed in claim 9 including inspecting a surface of cleaned work pieces prior to further processing of the surfaces.

12. A method as claimed in claim 9 including distinguishing substrates with a cleaned surface, flawed substrates or damaged substrates.

13. A method as claimed in claim 9 including controlling the laser source output in at least one of the following respects: laser power, number of laser pulses, or angle of laser power directed to the surface.

14. A method as claimed in claim 9 including measuring the output of the laser source in at least the respects of the intensity of scattered light from the substrate or the angle of the scattered light from the substrate.

15. A method as claimed in claim 13 including measuring the output of the laser source in at least the respects of the intensity of scattered light from the substrate or the angle of the scattered light from the substrate.

16. A method of manufacturing a recording media comprising:

providing a substrate having a surface;

subjecting the surface to an output of a laser source for applying a cleaning energy to the surface and thereby removing contaminants;

analyzing the laser source output to inspect the surface being cleaned and to measure the effect of the cleaning; and controlling the laser source output in response to the measured effect of cleaning.

17. A method as recited in claim 16, further comprising the steps of applying a layer of magnetic material to the substrate surface after said steps of subjecting and analyzing.

18. A method as recited in claim 16 further comprising the steps of applying a layer of magnetic material to the substrate surface, prior to said steps of subjecting and analyzing.

* * * * *